(12) United States Patent
Sadowski et al.

(10) Patent No.: US 6,744,917 B1
(45) Date of Patent: Jun. 1, 2004

(54) APPARATUS AND METHOD FOR RECOGNIZING COLOR SPACE OF A DIGITAL VIDEO INPUT

(75) Inventors: Greg Sadowski, Santa Clara, CA (US); Bob Williams, Los Altos, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/521,234

(22) Filed: Mar. 8, 2000

(51) Int. Cl.[7] .............................. G06K 9/00; G06K 9/68
(52) U.S. Cl. ...................... 382/162; 382/165; 382/218
(58) Field of Search .................... 382/162, 165, 382/218, 261, 262, 264; 348/500, 508, 505, 571, 587, 592, 674; 386/1, 12, 13

(56) References Cited

U.S. PATENT DOCUMENTS

| | | | |
|---|---|---|---|
| 5,608,461 A | | 3/1997 | Sadowski et al. ............ 348/526 |
| 6,034,735 A | * | 3/2000 | Senbongi et al. ............ 348/505 |
| 6,271,891 B1 | * | 8/2001 | Ogawa et al. ............... 348/674 |
| 6,453,109 B1 | * | 9/2002 | Yamamoto .................... 386/13 |

* cited by examiner

Primary Examiner—Andrew W. Johns
Assistant Examiner—Amir Alavi
(74) Attorney, Agent, or Firm—Lee & Hayes, PLLC

(57) ABSTRACT

A color space detector (30) for recognizing a color space of a digital video input includes a high frequency detector (32) that identifies a presence of either blue data or possible color difference data in color information carried in the digital video input. A data sample correlator (34) is also used to identify a presence of either blue data or color difference data in the color information. Other detectors (36) provide an indication as to the type of color space present on the digital video input. A determinator receives and analyzes the results from the high frequency detector (32), the data sample correlator (34), and the other detectors (36) and generates a control signal in response to these results. The control signal indicates that the color information includes one of red/green/blue data, YCrCb data, or indeterminate data.

15 Claims, 3 Drawing Sheets

APPARATUS AND METHOD FOR RECOGNIZING COLOR SPACE OF A DIGITAL VIDEO INPUT

TECHNICAL FIELD OF THE INVENTION

The present invention relates in general to video processing and more particularly to an apparatus and method for recognizing color space of a digital video input.

BACKGROUND OF THE INVENTION

The introduction of many new digital video standards creates a challenge with respect to interfacing various video equipment. On the same physical connection, a variety of different video and audio formats can be transported thereon. Over fifty different digital video formats have been standardized and this number is likely to continue to grow. Equipment exists that support only a small number of formats and to provide such support manual configuration of the equipment is required for proper operation with a particular format. Further, digital video streams do not have unique identifiers that completely describe all aspects of its format. Therefore, it is desirable to use equipment that can handle any type of format without requiring manual configuration to provide such support.

SUMMARY OF THE INVENTION

From the foregoing, it may be appreciated by those skilled in the art that a need has arisen for an interface that can recognize digital video format parameters and automatically configure video equipment to properly handle the recognized video stream. In accordance with the present invention, an apparatus and method for recognizing color space of a digital video input are provided that substantially eliminate or reduce disadvantages and problems associated with conventional digital video processing techniques.

According to an embodiment of the present invention, there is provided a method for recognizing color space in a digital video input that includes receiving a digital video input and extracting color information from the digital video input. The presence of blue data or color difference data in the color information is detected and a determinination is made as to whether blue data or color difference data is carried in the color information. Upon such determination, a control signal indicating the presence of one of blue data, color difference data, or indeterminate data in the color information is provided.

The present invention provides various technical advantages over conventional digital video processing techniques. For example, one technical advantage is to recognize video format parameters of any video standard in a digital video input. Another technical advantage is to automatically configure a system to the format that is recognized at the digital video input. Yet another technical advantage is to provide a capability to recognize the color space of a digital video input. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
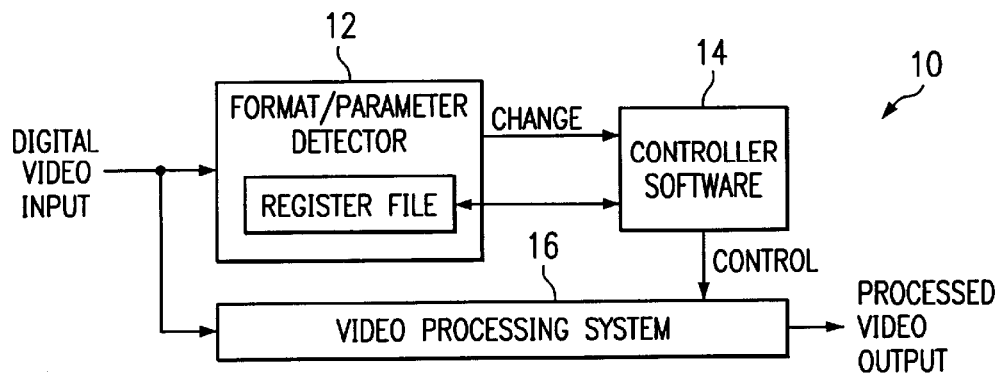
FIG. 1 illustrates a block diagram of a smart digital video interface.

FIG. 1 is a block diagram of a smart digital video interface 10. Smart digital video interface 10 includes a format/parameter detector 12, a controller 14, and a video processing system 16. A digital video input is provided to both format/parameter detector 12 and video processing system 16. Format/parameter detector 12 analyzes the digital video input to determine how video processing system 16 needs to be configured in order to generate an accurate processed video output. Upon analysis, format/parameter detector 12 stores configuration variables in a register file 18. If configuration variables have been changed from previous values, format/parameter detector 12 provides a change signal to control software module 14. Controller 14 interacts with register file 18 in order to provide one or more control signals to video processing system 16. Video processing system 16 uses the control signals to reconfigure itself to properly process the digital video input in order to generate the processed video output.

Format/parameter detector 12 includes hardware components to perform a variety of analysis on the digital video input. The digital video input may be analyzed as a serial stream of data or in a parallel format. The analysis may identify various features that may be used to configure video processing system 16, including video raster measurements, color space detection, ancillary data detection, input signal presence, dual link processing, and video reference timing extraction. Controller 14 receives information about detected digital video input features from format/parameter detector 12 in order to configure video processing system 16 without any manual intervention. In this manner, input driven automatic configuration may be achieved.

Figure 2:
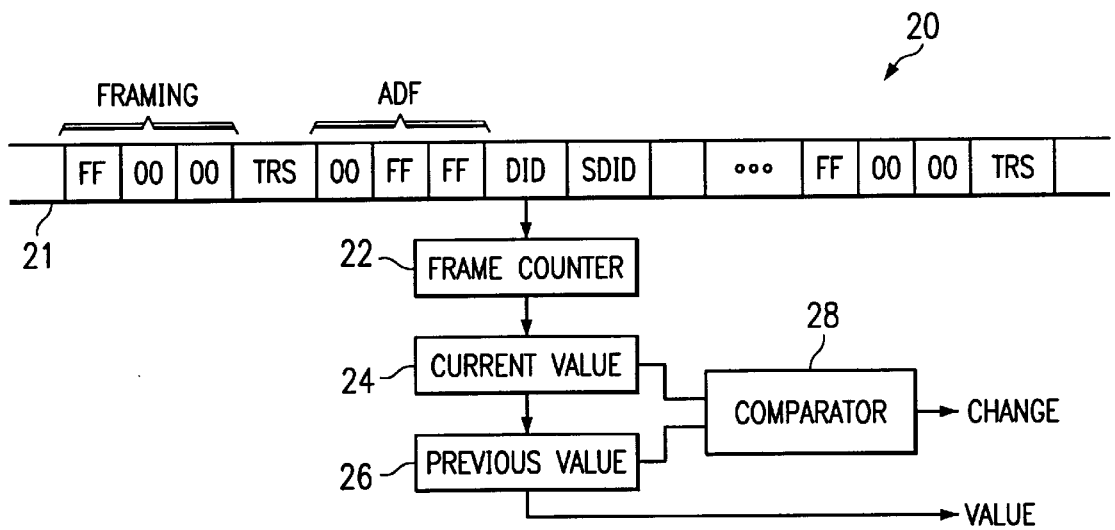
FIG. 2 illustrates a block diagram of a raster parameter extractor of the smart digital video interface.

FIG. 2 is a block diagram of a raster parameter extractor 20 of smart digital video interface 10. Raster parameter extractor 20 includes a frame counter 22, a current value store 24, a previous value store 26, and a comparator 28. Frame counter 22 determines a start of a frame in the digital video input. Format 21 shows an example of the digital video input. The digital video input carries three signaling bits H, V, and F corresponding to horizontal, vertical, and field timing. The H, V, and F signaling bits are embedded in a timing reference signal (TRS) word that is proceeded by an exclusive data pattern of three hexadecimal framing words FF, 00, and 00. Every TRS word updates the H, V, and F signaling bits. Frame counter 22 identifies the framing words FF, 00, and 00 and stores the accompanying TRS word into current value store 24. Comparator 28 compares the H, V, and F signaling bits in the TRS word placed in current value store 24 to the H, V, and F signaling bits of a previously identified TRS word stored in previous value store 26. Upon detecting any variations, comparator 28 generates a change signal used by controller 14 for processing of the variations in the signaling bits.

Every newly encountered TRS word updates the state of the H, V, and F signaling bits. By detecting the framing words, stripping out the H, V, and F signaling bits, and measuring the time between changes in their states, everything about the timing of the digital video input can be determined. In this manner, the video resolution of the digital video input can be recognized such that arbitrary resolution of video can be achieved. The following are examples of raster parameters which may be determined using raster parameter extractor 20:

Line length of active video—the time interval (in clock cycles) when the H bit is in the low state.;

Duration of horizontal blanking—time interval (in clock cycles) when the H bit is in the high state;

Number of lines in a field—time interval (in lines) when the V bit is in the low state;

Length of Vertical blanking—time interval (in lines) when the V bit is in the high state;

Interlaced format—the F bit changing in a predetermined manner (for 2:1 interlacing, the F bit toggles during every vertical blanking interval);

Progressive format—no change in the state of the F bit; and

Vertical rate—time interval (in clock cycles) between V bit rising edge events.

The TRS word also includes a few parity bits to protect the integrity of the H, V, and F signaling bits. The digital video input also includes clock information that may be used to run and synchronize the circuits in smart digital video interface 10.

Similar circuitry may be used to detect ancillary data in the digital video input. Active video data occupies about eighty-four percent of the available transport bandwidth. Data slots between active video data, as well as vertical blanking, are used to send ancillary data packets such as control data, digital audio, linear time code, vertical interval time code, error detection and handling, as well as other types of ancillary data. Ancillary data is detected by recognizing a unique ancillary data flag (ADF) data pattern (00, FF, FF) that follows the framing words and TRS word discussed above. Once the ADF data pattern is recognized, the data words that follow fully identify the data count and type of ancillary data. Information contained in the data words is used to verify proper receipt of the ancillary data. The ancillary data includes a primary data identification word (DID) and a secondary data identification word (SDID). The DID and SDID words are compared to a table maintained by smart digital video interface 10 of known data identification values in order to determine the data type and configure smart digital video interface 10 accordingly. The following is an example of this table comparison:

DID 164 SDID 64: linear time code.
DID 164 SDID 7F: vertical interval time code.
DID 140 SDID 101: serial data transport interface.
DID 1F4 SDID 200: error detection and handling.

Other recognition codings may be programmed into the table as desired. The DID and SDID words also include parity bits for data integrity verification.

A separate input signal presence detector may be used to verify that data is present on the digital video input. Video equipment is typically interconnected with a variety of cables and the continues monitoring of the presence of the input clock and the TRS word is useful to verify that cables are operating correctly and connectors are fully seated. The status of the input signal can be passed on to controller 14 of smart digital video interface 10 so that it can react to an indication that the input signal is no longer present. Controller 14 may insert the status of the input signal into the output video data stream to ensure output integrity, especially at points where the output video stream is a function of the input.

Figure 3:
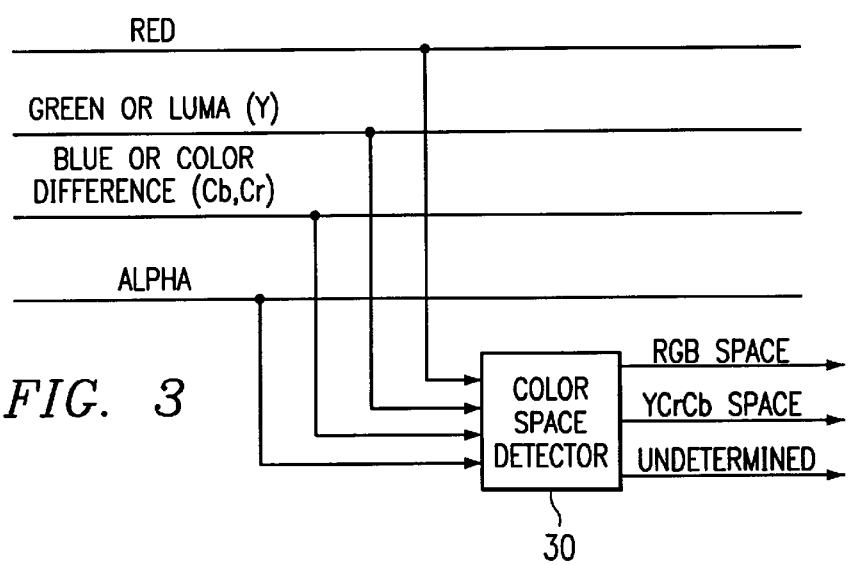
FIG. 3 illustrates a block diagram of color space detection performed by the smart digital video interface.

FIG. 3 is a block diagram of color space detection performed by smart digital video interface 10. In most digital video systems, two main color spaces are used—red/green/blue (RGB) and YUV (YCrCb 4:2:2). In both cases, digital video data may be sent over the same interfaces and system data buses. A color space detector 30 may receive color information over four system data buses. For the RGB color space, the system data buses include red, green , blue, and alpha. For the YUV 4:2:2 color space, the luma (Y) data is transported on the same system data bus as the RGB green data and the color difference (CrCb) data is transported on the same system data bus as the RGB blue data. Color space detector 30 can detect which color space encoding is used by analyzing the active video data as it flows on the system data buses.

Figure 4:
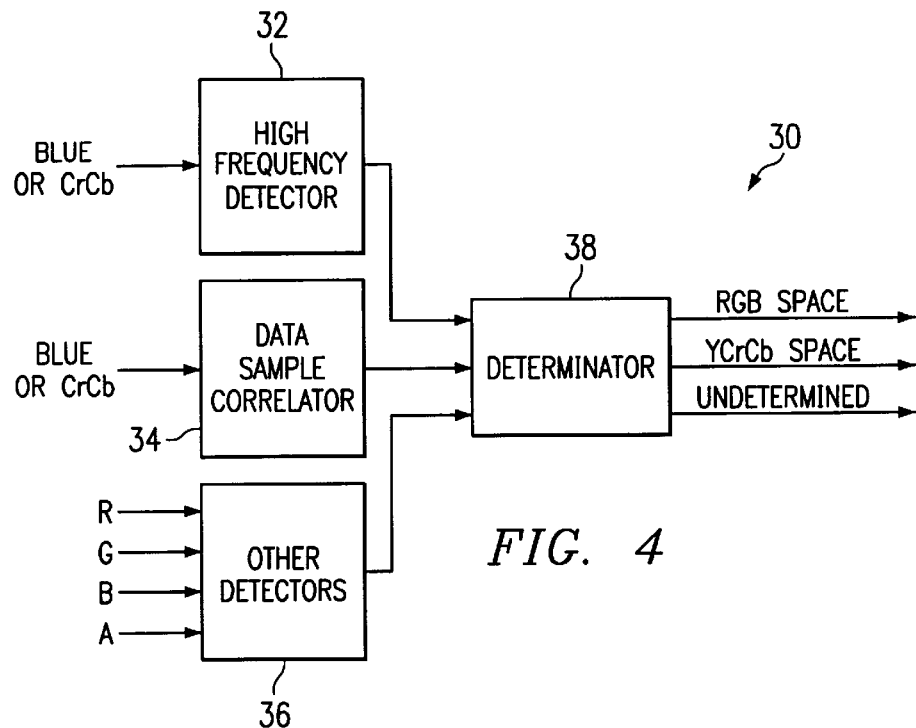
FIG. 4 illustrates a block diagram of a color space detector of the smart digital video interface.

FIG. 4 is a block diagram of a color space detector 30 of smart digital video interface 10. Color space detector 30 uses a number of detectors to test for certain conditions in the data streams. Color space detector 30 includes a high frequency detector 32, a data sample correlator 34, other detectors 36, and a determinator 38. All of these detectors report their results of analyzing the input data stream to determinator 38 which decides what color space the data is likely to be in, such as RGB, YUV, or possibly undetermined where the color space cannot be fully and accurately detected. Other detectors 36 may be used for black and white RGB or YUV 4:2:2 video detection.

Figure 5:
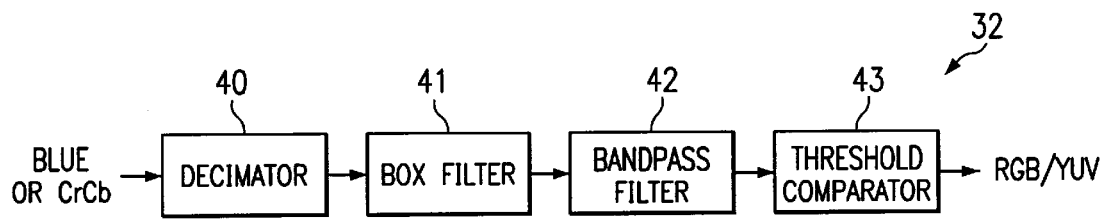
FIG. 5 illustrates a block diagram of a high frequency detector used in the color space detector.

FIG. 5 is a block diagram of high frequency detector 32 used in color space detector 30. For YUV 4:2:2 mode, the BLUE system data bus carries multiplexed samples of color difference Cr and Cb signals. In RGB mode, the BLUE system data bus carries consecutive samples of blue color data. Information carried on the BLUE system data bus is fed to a decimator 40. In the case of a CrCb stream on the BLUE system data bus, decimator 40 drops all Cr samples and inserts zeros in the data stream for the Cr samples. A box filter 41 replicates the Cb samples and replaces the inserted zeros with the replicated Cb samples. Alternatively, the Cb samples may be dropped and the Cr samples replicated with equal effectiveness. In the case of RGB blue data, every other blue sample is dropped and substituted with a zero by decimator 40 and the remaining blue samples are replicated and replace the inserted zeros by box filter 41. The resulting signal after performance of decimation and replication is fed to a bandpass filter 42. Bandpass filter 42 passes only frequency components in the narrow range around 0.25 Fs, where Fs is the sampling frequency. For CrCb data, the frequency components around 0.25 Fs are attenuated by at least 6 db. For blue data, frequency components around 0.25 Fs are not attenuated. A threshold comparator 43 compares the resulting signal from bandpass filter 42 to a threshold value. Due to the effects of attenuation, if the amplitude of the resulting signal exceeds the threshold value, then the data received on the BLUE system data bus is blue color data. In this situation, threshold comparator 43 sends out a Signal indicating that the color space is RGB. If the amplitude of the resulting signal does not exceed the threshold value, then the data received on the BLUE system data bus may be CrCb color difference data. In this situation, threshold comparator 43 sends out a signal indicating that the color space is YUV.

In essence, high frequency detector 32 detects for the likely presence of RGB color space if the RGB data happens to include frequency components around 0.25 Fs. If high frequency detector 32 does not detect anything, it is likely though not certain that the color space of the data is YCrCb. If high frequency detector 32 detects something, the data is certainly RGB color space.

Figure 6:
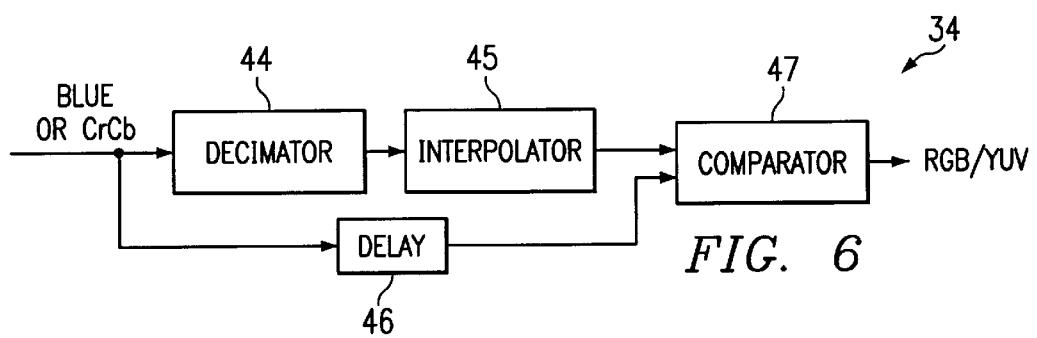
FIG. 6 illustrates a block diagram of a data sample correlator used in the color space detector.

FIG. 6 is a block diagram of data sample correlator 34 used in color space detector 30. Data sample correlator 34 includes a decimator 44, an interpolator 45, a delay module 46, and a comparator 47. Decimator 44 performs a similar function as decimator 40 discussed above by rejecting every other sample of the input. Interpolator 45 interpolates new samples from non-rejected samples for insertion into the data stream with the non-rejected samples. Comparator 47 receives the decimated and interpolated result from interpolator 45 and the original input as synchronized by delay module 46. Comparator 47 compares the interpolated samples generated by interpolator 45 with the rejected samples carried in the original input. If the interpolated samples substantially match the rejected samples, then comparator 47 sends out a signal indicating that the color space is RGB. If there is no substantial match, then comparator 47 sends out a signal indicating that the color space is YUV.

Determinator 38 receives results from high frequency detector 32, data sample correlator 34, and other detectors 36 in order to provide a final determination of the identity of the color space of the input data. A determination of a RGB color space may be made if both high frequency detector 32 and data sample correlator 34 indicate a result of RGB. A determination of a YUV color space is made if both high frequency detector 32 and data sample correlator 34 indicate a result of YUV. If high frequency detector 32 provides a likely YUV result but data sample correlator 34 provides a likely RGB result (or vice versa), determinator 38 may rely on one detector more than another detector in order to make its determination. For example, determinator 38 may rely more on data sample correlator 34 than on high frequency detector 32 and indicate that the color space is RGB. Determinator 38 may also rely on other detectors 36 in making the final determination as to the identity of the color space. Determinator 38 may also provide an indication that the color space can not be determined according to inconsistent results from all of the detectors. For an undetermined result, manual intervention will be necessary to program the correct color space.

Figure 7:
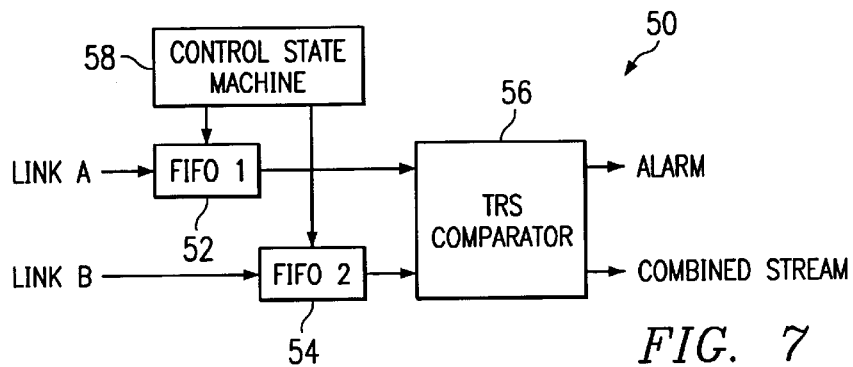
FIG. 7 illustrates a block diagram of a dual link detector of the smart digital video interface.

FIG. 7 is a block diagram of a dual link detector 50 of the smart digital video interface 10. Dual link detector 50 includes a first buffer 52, a second buffer 54, a comparator 56, and a control state machine 58. Dual link detector 50 is used when certainn types of video transport formats define two separate video streams that correspond to two physical interfaces or links. For example in a 4:4:4:4 YCrCbA format, link A may carry fully sampled luminance Y information as well as sub-sampled 4:2:2 color difference CrCb information while link B may carry fully sampled Alpha data and the other samples of color difference. For RGBA formats, link A may carry green and blue data while link B may carry red and alpha data or the links may carry multiplexed color data. The data streams on the two links must be combined before proper video processing can be performed. If the links use different length cables to carry the data, a delay must be applied to one of the links in order to synchronize them prior to combination.

Data streams from links A and B are stored in buffers 52 and 54 respectively. Data from a link is clocked into its associated buffer with the clock signal for that link. One of the link clock signals may be coupled to phase locked loop circuit to produce a signal with an improved jitter performance for use by the rest of the circuitry. The depth of the buffers determines the maximum allowed phase difference between links. Control state machine 58 sets the read pointers for link A and link B so that they are synchronized. The TRS words from the two streams are compared and control state machine 58 operates to make the comparison successful. If the comparison is not successful, links A and B are not synchronized with each other. Comparator 56 generates an alarm that indicates lack of synchronization. For example, lack of synchronization may occur as a result of one of the links being driven by a video timing format that is different than the other link, the length of one of the links is too long, or a link has an intermittent connection. Comparator 56 may also generate an alarm signal indicating that the phase difference between the links is near an allowed maximum value with any fluctuation in timing causing a loss of synchronozation. Comparator 56 also provides the combined data stream from the two links.

Figure 8:
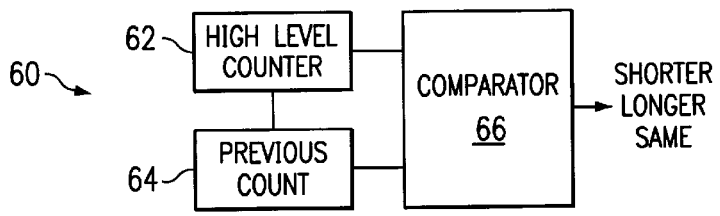
FIG. 8 illustrates a block diagram of a reference signal detector of the smart digital video interface.

FIG. 8 is a block diagram of a reference signal detector 60 of smart digital video interface 10. Reference signal detector 60 includes a high level counter 62, a previous count buffer 64, and a comparator 66. Reference signal detector 60 is used to find a particular data pattern in a train of pulses. Though digital video transport streams contain timing information, clock frequencies slightly vary from one source to another. If clock frequencies are not synchronized, horizontal and vertical alignment will eventually be lost. Video equipment that generates video output streams in a video system are synchronized to one source of reference clock and each video device tracks the fluctuations of the clock source. Each video device receives a video reference signal that carries information about horizontal and vertical timing. Video reference signals may have different voltage levels and electrical encoding of timing information. Examples include a transistor transitor logic composite synchronization signal with a voltage swing of zero to five volts, a video composite synchronization signal with a voltage swing of zero to one volt and a burst color carrier included at a horizontal rate, a tri-level composite synchronization signal where the timing information is encoded in voltage transitions, and an analog video signal combined with synchronization signals like sync on green. Any of these video reference signals may be recognized and converted into an electrical internal type composite synchronization signal. This internal composite synchronization signal may be analyzed in order to extract, for example, horizontal synchronization pulses used to produce the clock signal.

Reference signal detector 60 analyzes the video reference signal in order to detect a start of a video frame, horizontal synchronization pulses, and field synchronization pulses for start of field and 3/2 pull down. Reference signal detector 60 measures the duration of pulses (time when the composite synchronization signal is at a high state) and compares the current measured value with the previous measured value. Comparator 66 may generate a "0" signal value when the current and previous measured pulses have substantially equal duration, A "1" signal value when the current measured pulse is shorter than the previous measured pulse, and a "2" signal value when the current measured pulse is longer than the previous measured pulse. The output of comparator 66 is matched with a video reference format included in a table in order to properly configure video processing system 16. Information as to the presence of a video reference signal, signal present but not supported, signal recognized, synchronization achieved, synchronization lost, and signal jitter performance may be communicated to controller 14. More information on video reference signal detection can be found in U.S. Pat. No. 5,608,461 which is hereby incorporated herein by reference.

Figure 9:
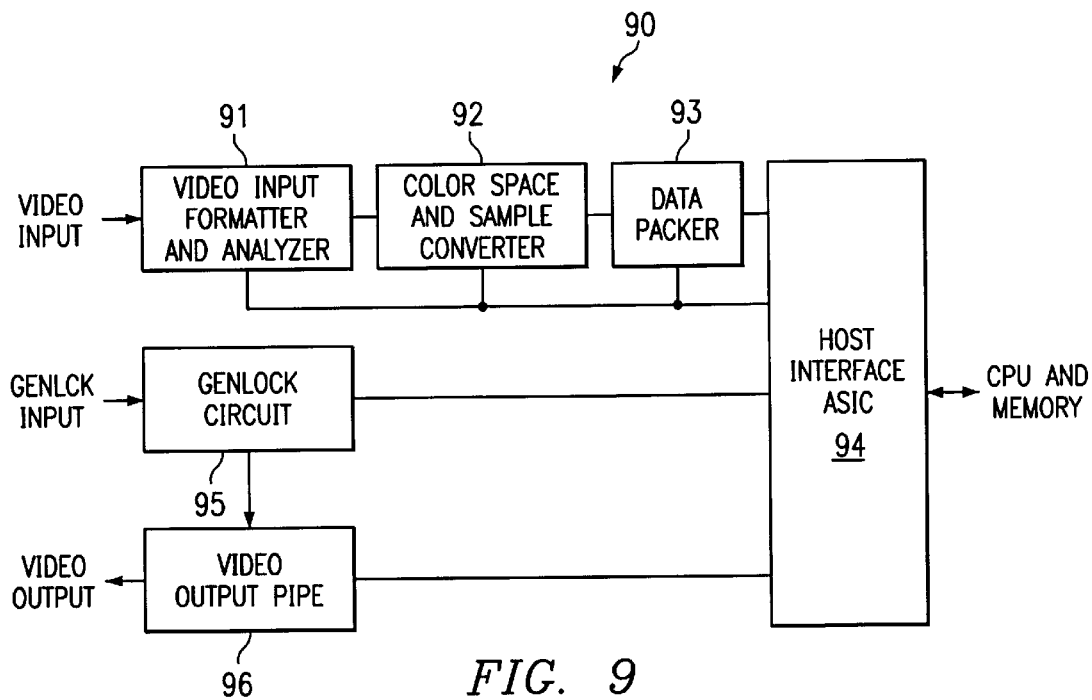
FIG. 9 illustrates a block diagram of a high definition digital video interface card incorporating the smart digital video interface.

FIG. 9 is a block diagram of a high definition digital video interface card 90 incorporating smart digital video interface 10. High definition digital video interface card 90 includes a video input formatter/analyzer 91, a color space and sample converter 92, a data packer 93, a host interface 94, a genlock circuit 95, and a video output pipe 96. Smart digital video interface 10 may be incorporated into video input formatter/analyzer 92. Reference signal detector 60 may be incorporated into genlock circuit 95. Changes in input video, as detected by the circuits discussed above, cause system interrupts in order to get immediate attention of controller 14. Most of the logic is preferably implemented in re-programmable field programmable gate array (FPGA) devices. Thus, mode changes can be achieved by reconfiguring the appropriate FPGA.

Thus, it is apparent that there has been provided, in accordance with the present invention, an apparatus and method for recognizing color space of a digital video input that satisfies the advantages set forth above. Although the present invention has been described in detail, it should be understood that various changes, substitutions, and alterations may be readily ascertainable by those skilled in the art. For example, though discussed with respect to the video portion of a multi-media data stream, the present invention may be equally applicable to recognizing extracting audio components in order to perform automatic configuration of the audio part of a system. Other examples may be incorporated herein without departing from the spirit and scope of the present invention as defined by the following claims.

What is claimed is:

1. A method for recognizing color space of a digital video input, comprising:
   receiving a digital video input;
   extracting color information from the digital video input;
   detecting for the presence of blue data or color difference data in the color information;
   determining whether blue data or color difference data is carried in the color information; and
   providing a control signal indicating the presence of one of blue data, color difference data, and indeterminate data in the color information.

2. The method of claim 1, further comprising:
   reconfiguring a processing capability for the digital video input in response to the control signal.

3. The method of claim 1, wherein the detecting step comprises:
   filtering the color information; and
   determining whether the filtered color information exceeds a threshold value.

4. The method of claim 1, further comprising:
   setting the control signal to indicate the presence of red/green/blue data in the color information in response to the filtered color information exceeding the threshold value.

5. The method of claim 3, further comprising:
   setting the control signal to indicate the presence of YCrCb data in the color information in response to the filtered color information not exceeding a desired threshold.

6. The method of claim 1, wherein the detecting comprises:
   rejecting every other sample of the color information;
   interpolating non-rejected samples of the color information; and
   comparing the interpolated non-rejected samples to the color information.

7. The method of claim 6, further comprising:
   setting the control signal to indicate the presence of red/green/blue data in the color information in response to the interpolated non-rejected samples substantially matching the color information.

8. The method of claim 6, further comprising:
   setting the control signal to indicate the presence of YCrCb data in the color information in response to the interpolated non-rejected samples not matching the color information.

9. The method of claim 1, wherein the detecting step comprises:
   performing a high frequency detection on the color information; and
   performing a data sample correlation detection on the color information.

10. The method of claim 9, wherein the determining comprises:
    deciding an identity of the color information in response to both the high frequency detection and the data sample correlation detection.

11. A color space detector for detecting a color type of a digital video input, comprising:
    a high frequency detector operable to identify a presence of either blue data or color difference data in color information carried in the digital video input;
    a data sample correlator operable to identify a presence of either blue data or color difference data in the color information; and
    a determinator operable to generate a control signal in response to results from the high frequency detector and the data sample correlator, the control signal indicating that the color information includes one of red/green/blue data, YCrCb data and indeterminate data.

12. The color space detector of claim 11, wherein the high frequency detector comprises:
    a decimator operable to reject every other sample of the color information;
    a box filter operable to replicate non-rejected color information, the box filter operable to insert the replicated non-rejected color information in place of the rejected color information;
    a bandpass filter operable to pass the non-rejected and replicated color information in a selected frequency range; and
    a threshold comparator operable to compare the passed color information to a threshold value, the threshold comparator operable to generate a result indicating a presence of red/green/blue data in the color information in response to the passed color information exceeding the threshold value.

13. The color space detector of claim 11, wherein the data sample correlator comprises:

a decimator operable to reject every other sample of the color information;

an interpolator operable to interpolate replacement samples from non-rejected samples; and a comparator operable to compare the rejected samples to the replacement samples, the comparator operable to generate a result indicating a presence of red/green/blue data in the information in response to the rejected samples substantially matching the replacement samples.

14. The color space detector of claim 11, further comprising:

one or more other detectors operable to identify a presence of either blue data of color difference data in the color information, the determinator operable to analyze all results from all detectors in order to generate the control signal indicating that the color information includes one of red/green/blue data, YCrCb data, and indeterminate data.

15. The color space detector of claim 11, wherein the determinator generates a control signal indicating the presence of indeterminate data in the color information in response to a result from the high frequency detector indicating the presence of red/green/blue data and a result from the data sample correlator indicating the presence of YCrCb data.

* * * * *

UNITED STATES PATENT AND TRADEMARK OFFICE
CERTIFICATE OF CORRECTION

PATENT NO. : 6,744,917 B1
DATED : June 1, 2004
INVENTOR(S) : Sadowski et al.

It is certified that error appears in the above-identified patent and that said Letters Patent is hereby corrected as shown below:

Column 3,
Line 21, delete "." after "state".

Column 5,
Line 2, replace "Signal" with -- signal --.

Column 9,
Line 8, insert -- color -- between "the" and "information".
Line 14, replace "of" with -- or -- after "data".

Signed and Sealed this

Third Day of August, 2004

JON W. DUDAS
*Acting Director of the United States Patent and Trademark Office*